R. P. PALMER.
REGISTER.
APPLICATION FILED MAY 24, 1912.
1,063,723.
Patented June 3, 1913.
3 SHEETS—SHEET 1.
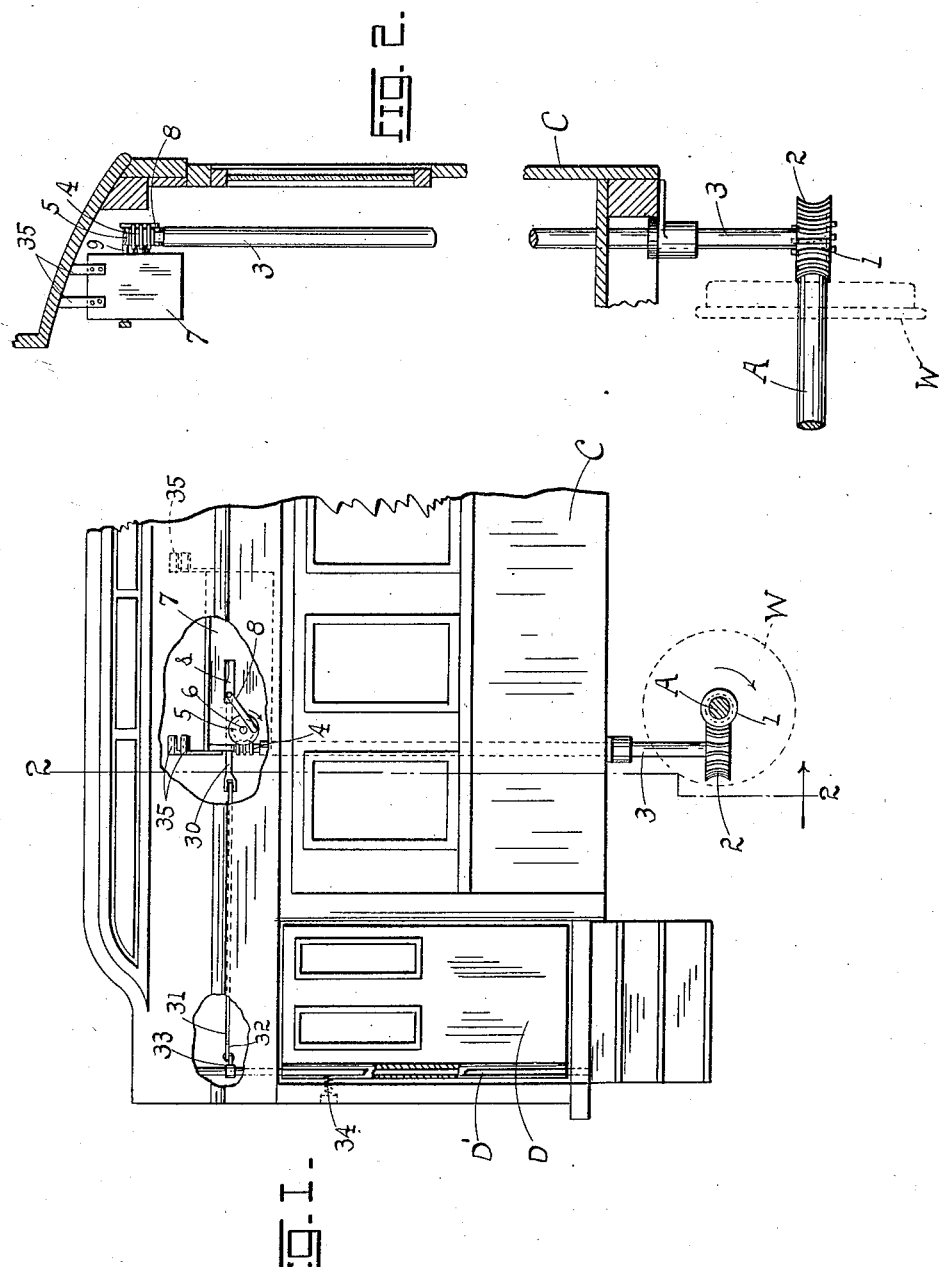
WITNESSES:
INVENTOR.
Reuben P. Palmer.
BY
ATTORNEY.

R. P. PALMER.
REGISTER.
APPLICATION FILED MAY 24, 1912.
1,063,723.
Patented June 3, 1913.
3 SHEETS—SHEET 2.
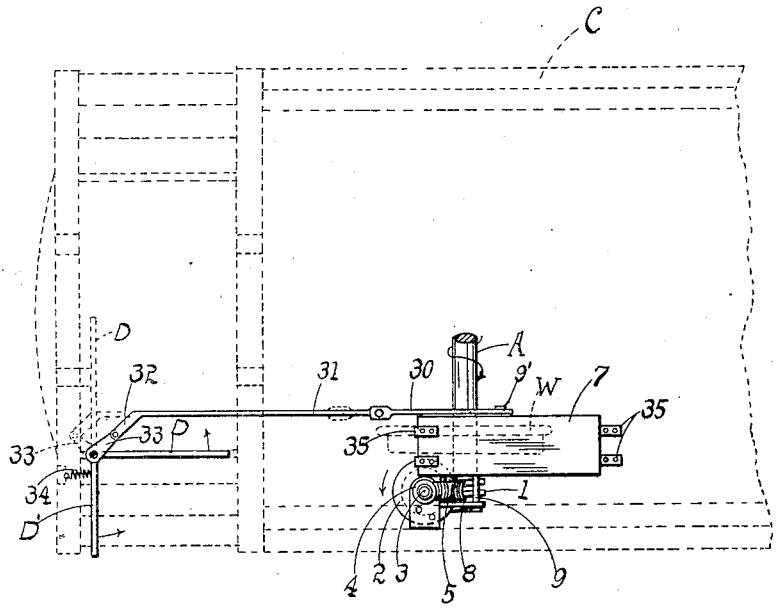
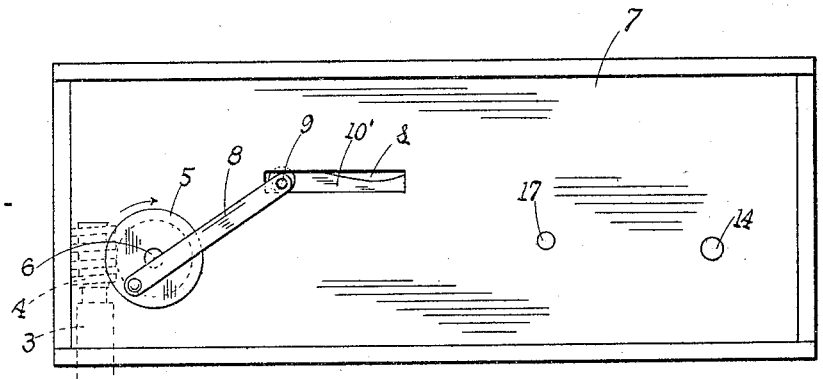
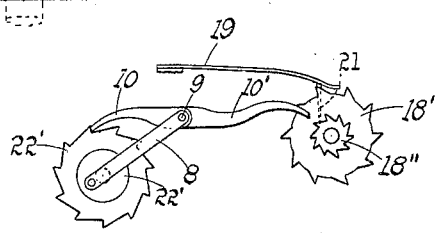
WITNESSES:
Harry A. Beines.
Jos. A. Michel
INVENTOR.
Reuben P. Palmer.
BY
ATTORNEY.

R. P. PALMER.
REGISTER.
APPLICATION FILED MAY 24, 1912.
1,063,723.
Patented June 3, 1913.
3 SHEETS—SHEET 3.
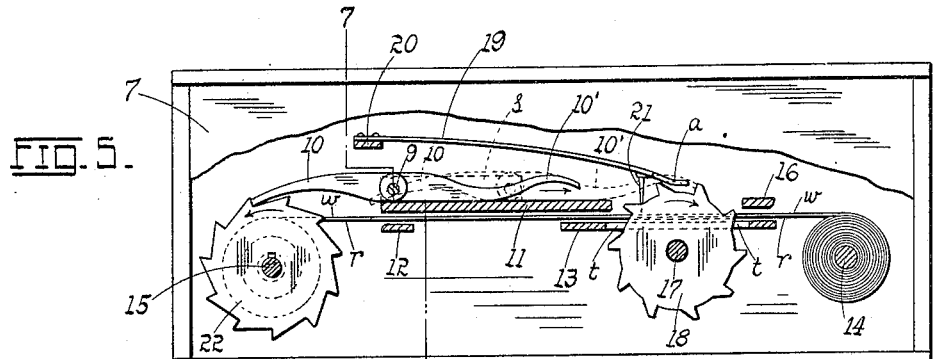
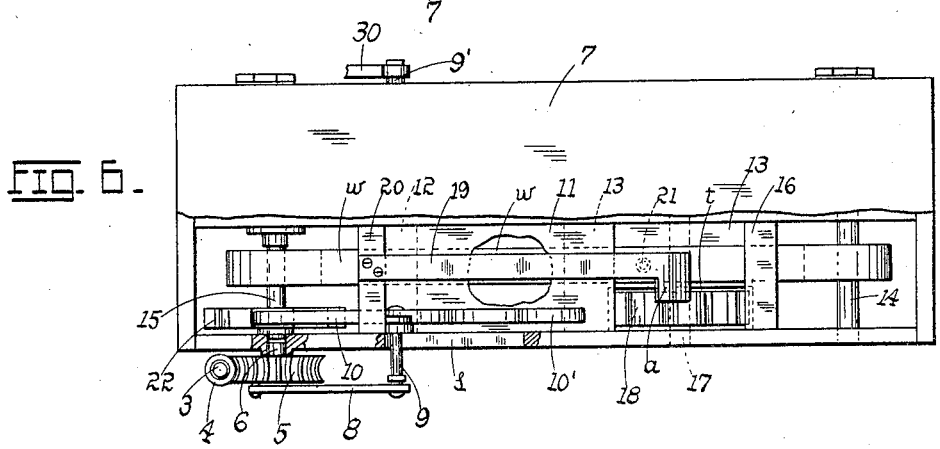
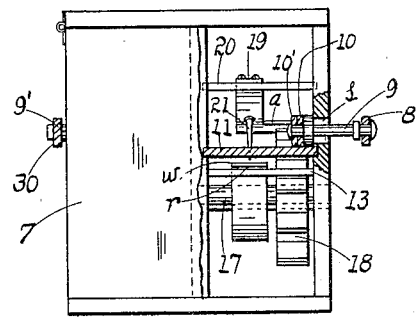
WITNESSES:
Harry A. Beimes
Jos. A. Michel
INVENTOR.
Reuben P. Palmer.
BY
Emil Stoven
ATTORNEY.
COLUMBIA PLANOGRAPH CO., WASHINGTON, D. C.

UNITED STATES PATENT OFFICE.

REUBEN P. PALMER, OF ST. LOUIS, MISSOURI.

REGISTER.

1,063,723. Specification of Letters Patent. Patented June 3, 1913.

Application filed May 24, 1912. Serial No. 699,505.

*To all whom it may concern:*

Be it known that I, REUBEN P. PALMER, citizen of the United States, residing at St. Louis, State of Missouri, have invented certain new and useful Improvements in Registers, of which the following is a full, clear, and exact description, reference being had to the accompanying drawings, forming a part hereof.

My invention has relation to improvements in registers; and it consists in the novel details of construction more fully set forth in the specification and pointed out in the claims.

In the drawings, Figure 1 is a side elevation of one end of a conventional railway car, with parts broken away, showing my invention applied thereto; Fig. 2 is a vertical transverse section on the line 2—2 of Fig. 1; Fig. 3 is a top plan of the register, the car being shown dotted; Fig. 4 is a side elevation of one side of the casing housing the register mechanism; Fig. 5 is a side elevation of one side of the register casing, with wall partly removed to show the inner working parts of the register; Fig. 6 is a top plan with wall of casing partly removed to show the operating parts of one of the registers; Fig. 7 is a vertical transverse section on the zig-zag line 7—7 of Fig. 5, showing the operating parts of one of the registers, the end wall of the casing being partly removed for the purpose; and Fig. 8 is a side elevation of a diagrammatic character showing a modified form of ratchet disk for actuating the stylus carrying arm.

The present invention is particularly directed to registering or recording the number of miles traveled by a car in the course of a journey, though the device may with equal propriety be used to record the number of passengers entering said car, or in fact, it may be applied for any other kindred purpose.

The object of the invention is to construct a register the mechanism of which shall be reduced to a minimum number of working parts; one which shall be positive in action, and accurate; one which is simple, readily applied to the purpose in view, and one possessing further and other advantages better apparent from a detailed description of the invention which is as follows:

Referring to the drawings, and for the present to Figs. 1 to 7 inclusive, and to the register as applied for purposes of registering the mileage, C represents a conventional railroad car, A the car axle, and W the car-wheel as well understood in the art. At any convenient point of the car-axle is mounted a worm pinion 1 which meshes with a worm-gear 2 at the lower end of a vertical drive-shaft 3, supported in suitable bearings on the car and projecting upwardly through the floor of the car as shown (Fig. 2). The upper end of the shaft 3 terminates in a worm pinion 4 which meshes with a vertically rotating worm-gear 5 mounted on a stud 6 on the side wall of the casing 7 which forms the housing for the operating parts of the registering mechanism. The gear 5 performs the function of a crank-disk having pivotally secured to the outer face thereof one end of a connecting rod 8 whose opposite end is pivotally secured to a pin 9 traversing an elongated slot *s* in the side wall of the casing, the inner end of the pin having pivotally secured thereto the gravity pawls 10, 10', mounted in the casing over a platform 11 as shown (Fig. 5). Beneath the platform 11 are the guide-strip 12 and a web-supporting plate 13 over which pass the paper web *w* and its accompanying ink-ribbon *r* (or carbon paper) and between which and the platform said web and ribbon are guided in their passage from the roll on one spindle 14 to the roll on the opposite spindle 15 and to be hereinafter more particularly referred to. In their initial passage over the plate 13 the webs are guided by a cross-strip 16 above the plate.

Mounted loosely on a spindle 17 carried by the casing 7 is a ratchet wheel 18 which projects above the plate 13 through a slot *t* therein, the teeth of the wheel being in co-operative connection with the pawl 10', the width of the teeth being sufficient to likewise permit engagement therewith of the terminal finger *a* of a flexed spring registering arm 19 having its fixed end secured to an anchor bar 20. Behind the finger *a* the arm 19 is provided with a point or stylus 21 which, as the finger *a* slips and drops from tooth to tooth of the ratchet 18 taps or strikes the web *w* (and the plate 13 supporting the web), the impact leaving an impression on the web as a result of the ink or carbon on the ribbon *r*. The opposite pawl 10 coöperates with a web-feed or advancing ratchet disk or wheel 22 keyed to the spindle 15, the ratchet advancing a tooth with each reciprocation of the pawl 10 toward it as more fully apparent from a description of the operation of the register which is substantially as follows:—Rotation being imparted to the car-axle A with the travel of the car, it is apparent that such rotation will be communicated through the reducing gears 1, 2, 4, to the worm crank-disk 5, the latter in turn imparting a reciprocating movement to the pawls 10, 10', through the connecting rod 8. The reducing gear is so proportioned that for the number of revolutions of the car-axle corresponding to one mile's travel of the car, a single revolution shall be imparted to the disk 5. As the pawl 10 reciprocates toward the ratchet 22 it will advance the latter a tooth in one direction thereby advancing the webs $w$, $r$, in the same direction over the roll mounted on the spindle 15, the webs unwinding from the roll on the spindle 14 (Fig. 5). As the pawl 10' on the other hand reciprocates toward the ratchet 18 the latter will be turned a tooth about its spindle 17 in an opposite direction, and in this movement the free end of the stylus-arm 19 will ride over the tooth so advanced and as the finger $a$ of the arm 19 drops off said tooth onto the succeeding tooth of the ratchet (18) the point of the stylus will impress itself on the web $w$ the impact leaving a mark on the under side of said web by reason of the contact thereof with the carbon or ink ribbon $r$. Thus, with every double stroke of the pawl 10 the disk 22 will advance a tooth, and with a double stroke of the pawl 10' the disk 18 will advance a tooth, that is to say, each disk will advance a tooth for a complete revolution of the crank-disk 5 which revolution corresponds to a mile of travel for the car C. Obviously, after the advance of one of the disks (22, 18) the car will travel a half mile before the other disk is advanced, the successive advances of the respective disks following each other every half mile; but as to either disk, the interval between two advances represents a mile of travel. It follows therefore, that the record on the ribbon or web $w$ will be a series of stylus impressions, each impression representing a mile of travel for the car. The spring of the arm 19 will always keep the finger $a$ in close contact with the teeth of the ratchet 18, the pawls 10, 10', on the other hand being gravity pawls whose weight will suffice to keep them in engagement with their respective ratchets.

It was stated above that the present device might be used for registering the number of passengers entering the car. To accomplish this all that is necessary is to connect the pin 9 to the car-door in any mechanical manner which will impart the necessary reciprocations to the pawls 10, 10'. In the present embodiment of my invention I mount two registers in a common casing 7, the pin 9' of one of the registers being coupled to a link 30 (Fig. 3) which is in turn pivotally connected to a connecting rod 31 having a bent arm or terminal 32 in hinged connection with a lever arm 33 rigidly carried at the corner of a double-winged or angle-door D, D', the panel D normally occupying a position across the entrance to the platform of the car. As a passenger enters, the panel D swings inwardly allowing the passenger to enter, the panel D' following and assuming the position first occupied by the panel D and thus preventing a second passenger from entering until after the door has been swung back to its original position under the action of the compression spring 34 secured to the panel D' and car platform respectively. It is apparent that with each back and forth swing of the door D as described, an oscillation will be imparted to the pin 9' and hence to the pawls 10, 10', of the particular register, the stylus impressions of such register recording the number of passengers which passed the door D.

In Fig. 8 I show a modified form of stylus-operating ratchet in which a step-form of ratchet is used, the large disk 18' serving to control the stylus-arm 19, while the smaller disk 18'' is actuated by the pawl 10'. By causing the pawl 10' to play over the small ratchet 18'' a shorter throw of the pawl may be improvised, as it is clearly obvious from the drawing that an advance of one tooth on the ratchet 18'' will cause an advance of a tooth in the ratchet 18', but with a much less throw on the part of the pawl 10', the diameter of the member 18'' being less than that of the member 18'. This arrangement too, permits the use of a smaller web-advancing ratchet 22', the mechanism in other respects being the same as that already described. The casing 7 may be secured to the car by straps 35 or any other suitable manner. Features shown but not alluded to come within the purview of the skilled mechanic and are not necessary to be described.

Having described my invention, what I claim is:—

1. In combination with a pair of rolls connected by a web adapted to wind on, and unwind from, the respective rolls, a ratchet disk disposed about the axis of one of the rolls, a second ratchet interposed between the rolls, a stylus carrying member actuated by said second ratchet to and from the web, the stylus being adapted to impinge against the web upon release of the member from a tooth of said ratchet, and suitable devices interposed between the ratchets for successively actuating the ratchets and advancing the same in opposite directions.

2. In combination with a pair of rolls connected by a web winding over one and unwinding from the opposite roll, a ratchet disk secured about the axis of the winding roll, a second ratchet disposed between the rolls on a shaft parallel to the axes of the rolls, an arm having a fixed end, and having its free end riding over the teeth of the second ratchet, a stylus on said arm positioned over the web, a pair of pawls pointing in opposite directions and coöperating with the respective ratchets, and means for imparting reciprocation to the pawls whereby the ratchets are successively advanced in opposite directions, the release of the spring arm from a tooth of the second ratchet causing the stylus to impinge on the web during the period of rest of said web.

3. In combination with a pair of rolls connected by a web winding over one and unwinding from the opposite roll, a ratchet disk secured about the axis of the winding roll, a second ratchet disposed between the rolls adjacent the web and rotating about a shaft parallel to the axes of the rolls, a spring arm having a fixed end, and having a free end riding over the teeth of the second ratchet, a stylus on said arm positioned opposite the web, a pair of pawls pointing in opposite directions and coöperating with the respective ratchets, a crank-disk, a connecting rod connecting the disk to the pawls for imparting reciprocation to the pawls with the rotation of the crank-disk, and means for rotating said crank-disk, the parts operating substantially as, and for the purpose set forth.

In testimony whereof I affix my signature, in presence of two witnesses.

REUBEN P. PALMER.

Witnesses:
  EMIL STAREK,
  JOS. A. MICHEL.

---

Copies of this patent may be obtained for five cents each, by addressing the "Commissioner of Patents, Washington, D. C."